United States Patent [19]
Oberbeck

[11] 4,122,385
[45] Oct. 24, 1978

[54] SATURABLE REACTOR CURRENT LIMITER

[75] Inventor: George A. Oberbeck, Belmont, Mass.

[73] Assignee: The Charles Stark Draper Laboratory, Inc., Cambridge, Mass.

[21] Appl. No.: 807,190

[22] Filed: Jun. 16, 1977

Related U.S. Application Data

[63] Continuation-in-part of Ser. No. 635,895, Nov. 28, 1975, Pat. No. 4,031,457, which is a continuation-in-part of Ser. No. 614,773, Sep. 19, 1975, abandoned.

[51] Int. Cl.$^2$ ............................ G05F 1/32; G05F 1/70
[52] U.S. Cl. ........................................ 323/92; 323/56; 336/110; 336/178
[58] Field of Search .................... 323/6, 9, 44 R, 56, 323/92; 336/110, 165, 178; 361/31, 38

[56] References Cited

U.S. PATENT DOCUMENTS

| | | | |
|---|---|---|---|
| 1,788,152 | 1/1931 | Dowling | 323/92 X |
| 2,435,062 | 1/1948 | Walsh | 323/92 |
| 2,844,786 | 7/1958 | Van Urk et al. | 323/92 |
| 2,972,715 | 2/1961 | Ringelman | 323/92 |

*Primary Examiner*—Gerald Goldberg
*Attorney, Agent, or Firm*—Kenway & Jenney

[57] ABSTRACT

A current limiter to protect circuit elements from excessive current caused by transient load impedance or power supply surges. A multiple branch element magnetic circuit includes at least one saturable branch element inductively coupled by a coil connected in series with the load of an external electric circuit. The magnetic circuit further includes lower permeance bias branch element which biases the saturable branch element in a low permeance, saturated state when current through the coil is below a predetermined threshold value, and which biases at least one saturable branch element in its high permeance, non-saturated state when current through the coil is in a predetermined range above and extending from the threshold value. A relatively high permeance shunt branch element provides a shunt path for magnetic flux. The coil provides a relatively high inductive impedance in series with the external electrical circuit when at least one saturable element is in its non-saturated state and provides a relatively low impedance otherwise.

1 Claim, 16 Drawing Figures

SATURABLE REACTOR CURRENT LIMITER

REFERENCE TO RELATED APPLICATION

This application is a continuation-in-part of my U.S. patent application Ser. No. 635,895, filed Nov. 28, 1975 now U.S. Pat. No. Pat. No. 4,031,457, which is a continuation-in-part of my U.S. patent application Ser. No. 614,773, fild Sept. 19, 1975, now abandoned. The present application is assigned to the same assignee as Ser. No. 635,895 and Ser. No. 614,773.

FIELD OF THE INVENTION

The present invention relates to current limiting devices and in particular to a magnetically biased saturable reactor current limiter.

BACKGROUND OF THE INVENTION

There is a need to protect circuit elements from excessive current caused by transient load impedance or power supply surges. The commonly applied thermal fuse or electromagnetic circuit breaker opens the circuit at a predetermined current or current-time product. Such devices are slow acting and do not respond to fast acting transients. In addition, a fuse must be replaced after open circuiting and not all circuit breakers close automatically after transient conditions.

Other approaches to limiting current have led to complex or weighty circuit elements.

SUMMARY OF THE INVENTION

In accordance with the present invention, a magnetically biased saturable reactor transient current limiter is provided that is fast acting, compact and automatically resets upon return to a normal current level. When coupled in series with the load in an electrical circuit, the current limiter introduces relatively low inductive impedance in series with the load when current through the circuit is below a predetermined threshold. However, when the current enters a predetermined range above that threshold, the device presents a relatively high inductive impedance in series with the load. The limiter automatically resets to a low impedance upon return to current levels below the threshold. The invention may be configured to limit direct and alternating (including three phase) currents.

According to one form of the invention, the current limiting device comprises at least three magnetic circuit branch elements extending between two nodes, and an input coil for electrically coupling the device to an external electric circuit. The first of the branch elements, or shunt leg, is characterized by a relatively high permeance throughout the range of operation of the device. The second of the branch elements is composed of a saturable magnetic material and passes through the input coil so that magnetic flux is induced in the second element in response to current in the input coil. This second branch element is characterized by a relatively high permeance when in its non-saturated state and a relatively low permeance otherwise. The third of the branch elements, or bias leg, is characterized by a relatively low permeance and includes an mmf bias means for establishing a relatively constant magnetic flux in that element throughout the range of operation of the device.

The relative permeances of the three elements establish a net magnetic flux density in the second element equal to the saturation flux density for that element when the current in the external electric circuit is below a predetermined threshold value. The net flux density in that second element is below the saturation flux density when the current in the input coil is in a predetermined range above and extending from the threshold. The permeance of the first and second legs (when non-saturated) is relatively high with respect to the medium external to the device, and, in addition, the non-saturated permeance of the first leg is less than the non-saturated permeance of the second leg. In this configuration, the shunt leg provides a high permeance flux path to accommodate the permeance changes in the second branch element when the input current crosses the threshold value.

For limiting a.c. surges, the first element may be configured with a pair of sub-elements extending between the nodes. In this configuration, the input coil includes windings which extend about each of the sub-elements and are connected so that the oppositely directed flux is induced in the sub-elements in response to current in the coil.

The invention may also limit current surges in n-phase systems by utilizing additional branch elements with associated input coils configured in the same manner described above for a.c. operation.

According to another form of the invention, the current limiting device comprises a multiple branch element magnetic circuit and an input coil for electrically coupling the device to an external electric circuit. The magnetic circuit includes a magnetic bridge network having a pair of upper leg elements joined at one end at a first node, a pair of lower leg elements joined at one end at a second node, and a cross element having each of its ends joined to a lower and upper leg element at a third and fourth node, respectively. The circuit further includes a magnetic bias element connected between the first and second nodes. The cross element passes through the input coil so that magnetic flux is induced in the cross element in response to current in the input coil.

The upper and lower legs connected to the third node are each composed of a saturable magnetic material and provide flux paths between the first and third and between the second and third nodes, respectively, which are characterized by a relatively high permeance when the respective leg elements are in their non-saturated states and a relatively low permeance otherwise.

The upper leg element connected to the fourth node (hereafter denoted as the upper shunt leg), together with the cross element, and the lower leg element connected to the fourth node (hereafter denoted as the lower shunt leg), together with the cross element, provides a flux path between the first and third nodes and between the second and third nodes, respectively, which are characterized by a relatively high permeance throughout the range of operation of the device.

The bias element is characterized by a relatively low permeance, and includes an mmf bias means for establishing a relatively constant magnetic flux in that element throughout the range of operation of the device. For example, the bias may comprise a permanent magnet or, alternatively, a coil with an associated current source configured to produce a magnetic field equivalent to that produced by such a permanent magnet.

The relative permeances of the bridge elements establish a net magnetic flux density in the upper and lower leg elements connected to the third node equal to the saturation flux density for those elements when the magnitude of the current through input coil is below a predetermined threshold value in each polarity. The net flux density in the upper element connected to the third node is below the saturation flux density when the magnitude of the current in the input coil is in a predetermined range above and extending from one threshold value, while the lower element connected to the third node remains saturated. Similarly, the net flux density in the lower element connected to the third node is below the saturation flux density when the magnitude of the current in the input coil is in a predetermined range above and extending from the other threshold value, while the upper element connected to the third node remains saturated. The permeance of the cross, upper and lower legs (when non-saturated) is relatively high with respect to the medium external to the device, and, in addition, the permeance of each of the upper and lower legs connected to the third node when non-saturated is greater than the permeance of the series combination of the cross element with either the upper or lower shunt leg. In this configuration, the respective series combinations of the cross element with the upper and lower shunt legs provides a high permeance flux path to accommodate the permeance changes in the corresponding upper and lower leg elements connected to the third node when the input current exceeds the threshold value. Accordingly, this configuration of the present invention is suitable for limiting current surges in either d.c. or a.c. cases, since input current surges in one polarity drive the upper leg element connected to the third node out of saturation, while input current surges in the other polarity drive the lower leg element connected to the third node out of saturation.

BRIEF DESCRIPTION OF THE DRAWINGS

These and other features of the present invention are illustrated below in the preferred embodiments, presented by way of example and not limitation, and in the accompanying drawings of which.

DESCRIPTION OF THE PREFERRED EMBODIMENT

The preferred embodiment for a direct current limiter comprises a magnetic circuit having three branch elements (or legs) extending between two nodes. The first leg is composed of a saturable material and is configured with an air gap. The second leg is also composed of a saturable material and is wound with an inductive coil which is electrically connected in series with the load. In the useful range of the embodiment, the first leg is characterized by a permeance which is relatively high compared to the medium external to the device, but less than the permeance associated with the second leg in its non-saturated state. The third leg is a permanent magnet. The winding direction of the coil is such that current through the coil produces flux in the second leg in opposition to the flux coupled therein from the permanent magnet leg. At relatively low coil current levels, the flux produced by the permanent magnet overcomes that produced by the coil so that the net flux in the second leg is sufficient to drive that leg into saturation and thereby maintain a low inductance circuit in series with the load. The permanent magnet also establishes a relatively low level of flux in the first leg.

With this configuration, a high transient current in the coil generates a high magnetomotive force (MMF) tending to offset the permanent magnet-induced flux in the second leg, thereby reducing the net flux in that leg. The reduction in flux in the second leg is accompanied by a related increase in flux in the third leg, and by a relatively small flux change in the permanent magnet path. As the second leg is driven out of saturation, its permeance is sharply increased. As a result, the inductive impedance provided by the coil to the external circuit is greatly increased during transient current conditions. When the current through the coil returns to a relatively low level, the above process reverses and the second leg returns to a permanent magnet induced saturated state.

Figure 1:
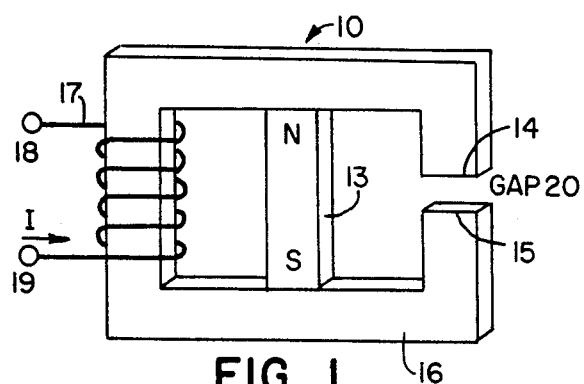
FIG. 1 is a pictorial view of a current limiter showing an air gapped reactor biased by a permanent magnet.

The direct current limiter 10 as shown in FIG. 1 includes a core 16 of saturable magnetic material formed in a C-shape with a gap 20 (filled with a relatively low permeability medium such as air) between planar surfaces 14 and 15. A winding 17 of the input coil, (excited by load current I), is disposed about the portion of core 16 opposite gap 20. A permanent magnet 13 is positioned inside core 16 to excite it in two parallel magnetic flux circuits, one coupling winding 17 and the other passing through gap 20.

Figure 2:
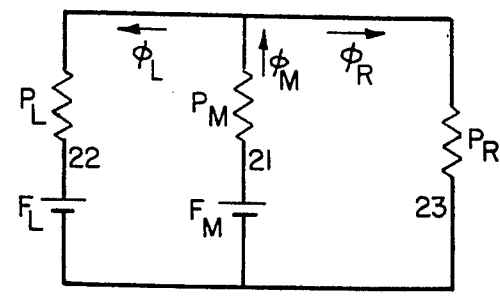
FIG. 2 is a magnetic circuit diagram of the current limiter shown in FIG. 1.

The magnetic circuit for current limiter 10 is shown schematically in FIG. 2. Magnetic branch elements (or legs) 21-23 extend between two nodes. Permanent magnet 13 is represented in leg 21 by its magnetomotive force (MMF) $F_M$ serially connected to its permeance $P_M$ and generating flux $\phi_M$. Current I is polarized with respect to terminals 18 and 19 to generate MMF $F_L$ in winding 17 in opposition to $F_M$ resulting in magnetic flux $\phi_L$ in leg 22. $P_L$ is the effective permeance of the partial section of core 16 through which flux $\phi_L$ passes. Leg 23 comprises $P_R$, the resultant of the permeances of gap 20 and the effective permeance of the connective core material forming the gap through which flux $\phi_R$ branches off from the permanent magnet. The above description of the magnetic circuit is expressed mathematically as:

$$\phi_M = \phi_L + \phi_R \qquad \text{Eq. 1}$$

$$F_M - (\phi_M/P_M) - (\phi_L/P_L) - F_L = 0 \qquad \text{Eq. 2}$$

$$F_M - (\phi_M/P_M) - (\phi_R/P_R) = 0 \qquad \text{Eq. 3}$$

At normal current levels the magnet MMF ($F_M$) overcomes $F_L$ to generate a high level of flux $\phi_L$ to saturate the core material in leg 22, creating a low permeance $P_L$ and thus a low inductive impedance to current flow. Also, the magnet sets a low unsaturated level of flux $\phi_R$ in leg 23.

A high transient current drives leg 22 out of the saturation region of its core material and into the high permeance region, thereby increasing the inductive impedance of winding 17. Leg 23 provides a flux shunting path whereby the decrease in flux in leg 22 is balanced primarily by an increase in leg 23 flux and a small decrease in leg 21 flux. In this manner, the permanent magnet operates in its reversible magnetic region throughout normal and transient current conditions, preventing demagnetization and allowing resetability of the current limiter upon return to normal current levels.

Figure 3:
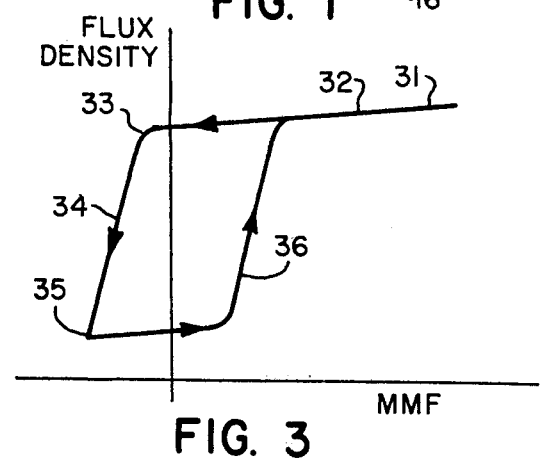
FIG. 3 is a magnetization curve for the saturating leg of the magnetic core in FIG. 1 under conditions of normal and high transient currents.
Figure 4:
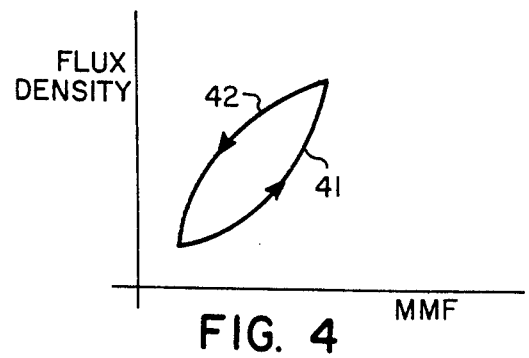
FIG. 4 is a magnetization curve for the non-saturating leg of the magnetic core in FIG. 1.
Figure 5:
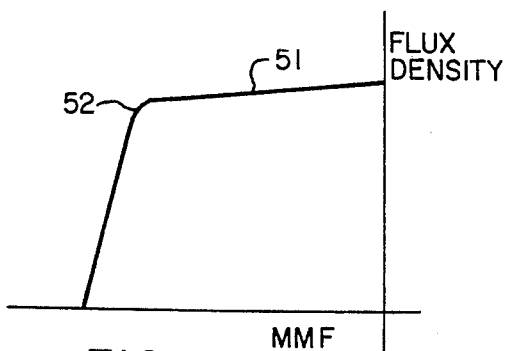
FIG. 5 is a demagnetization curve for the permanent magnet as shown in FIG. 1.

FIGS. 3, 4 and 5 further illustrate the operation of the invention. FIGS. 3 and 4 are magnetization curves of the core materials in legs 22 and 23 respectively for various operating conditions, and FIG. 5 is the demagnetization curve of the permanent magnet.

When no current is delivered to winding 17 the permanent magnet 13 biases the core material of leg 21 deep into the saturation region of the hysteresis loop designated by reference numeral 31 as shown in FIG. 3. As described, when current flows, the magnetomotive force is opposed to that of the magnet, thus moving the operating point to the portion of the curve designated by numeral 32. Increased current moves the operating point to position 33 where the core begins to be driven out of saturation. When operating in the low permeance saturation region of its core, winding 17 offers low inductive impedance to current. An abnormally high transient current drives the core into the high permeance region of section 34 of the curve where winding 17 exhibits a high inductive impedance, thereby opposing a further increase in current. Point 35 on the curve is reached at the peak of the transient current. For resetability of the current limiter, the transient current may not exceed the value causing irreversible demagnetization of the permanent magnet 13. As the current returns to normal levels, the operating point moves through section 36 of the curve and into the saturation region of section 32.

FIG. 5 is exemplary of a demagnetization curve for permanent magnet 13 of an alnico type material. Increased winding current tends to increase the MMF within the magnet driving the operation point down through section 51 of the curve. Driving the MMF beyond the knee 52 of the curve would cause irreversible demagnetization. Samarium cobalt of the other rare earth cobalt magnet materials known for their high resistance to irreversible demagnetization may be employed.

Preferably, the core material of leg 23 is operated at non-saturating flux density levels throughout normal and transient current conditions, the air gap permeance configured to provide a near saturation condition at the maximum transient current. As shown in FIG. 4, section 41 of the hysteresis loop represents increasing flux density in the core materials of leg 23 induced by a high transient current increasing the magnetomotive force $F_L$ in leg 22. Section 42 of the curve represents a closed loop return to the lower flux density at a normal current condition. Therefore, leg 23 provides the required shunting path for the collapsing flux field in leg 22. when a high transient current is applied to winding 17.

While the core may be made from any magnetically saturable material, it is preferred that it exhibit high permeability square loop hysteresis characteristic such as that of manganese zinc ferrites or nickel iron alloys.

As an alternative to the use of a permanent magnet to form the third leg, a bias coil and associated means for driving a bias current through the bias coil may be utilized. In such a configuration, the flux path in the third leg includes the region interior to the bias coil and the relatively low permeance air gaps between the bias coil and the junction points of first and second legs. Accordingly, the bias coil establishes the bias flux in the first leg. Current limiters for high current transmission lines may economically employ such a bias means using cryogenically cooled super conducting windings, requiring little or no power input to maintain a large biasing flux field.

Furthermore, various core configurations may be used so long as a core is combined with a biasing means to provide the required saturated and shunt magnetic flux paths according to the invention. In general, the core is configured and the magnet located to minimize leakage flux from the magnet.

Although it is generally desirable for the current limiter to exhibit low inductance at normal input current levels, where higher inductance is required, a second winding may be disposed on a non-saturating section of the core connected to the first winding in a series aided relationship. In this manner, the impedance to the current flow through the two windings is determined for both normal and high transient currents.

Figure 6:
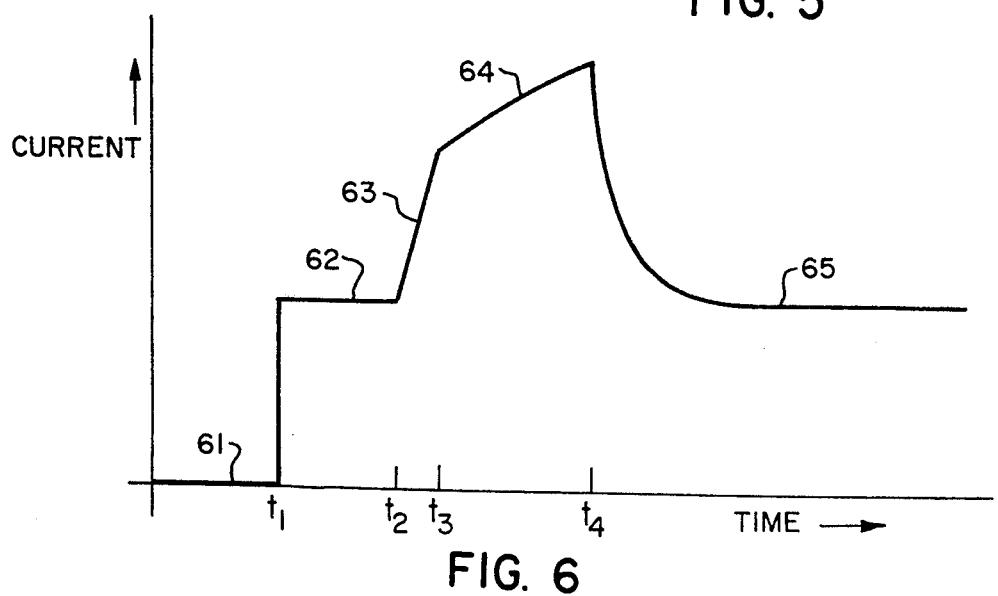
FIG. 6 is a plot of current against time during a cycle of normal and high transient currents for the current limiter as shown in FIG. 1.

FIG. 6 shows a plot of winding current against time during a cycle of normal current conditions and a surge such as occurs in the momentary shorting of a load in series with current limiter 10. The portion 61 of the plot is a period of no current flow through winding 17. At time $t_1$, the current limiter is excited to a normal level 62. A load short circuit at time $t_2$ causes a short surge in current, represented by portion 63, until time $t_3$ when the core starts to be driven out of saturation corresponding to the flux density operating point 33 of FIG. 3. As the current continues to increase, as represented by the portion 64 of the curve, its rate of increase is retarded by the high impedance of the winding operating in the unsaturated region of its core. At time $t_4$, the short circuit is removed and current returns to a normal current level 65. In this manner, a high transient current is prevented from flowing in the circuit.

Figure 7:
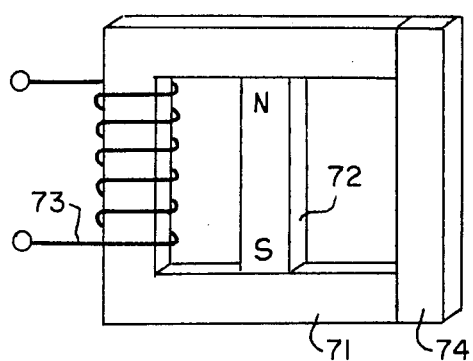
FIG. 7 is a current limiter wherein a section of low permeability material is attached coextensively to the core.

FIG. 7 depicts an alternate embodiment of the invention comprising a high permeability C-shaped core 71, a winding 73 disposed thereon, a low permeability I-shaped section 74 bridging the end faces of core 71 and a permanent magnet 72 biasing means. The equivalent permeance for leg 23 of FIG. 2 is achieved by means of a gapless section of low permeability, high saturation magnetic material. The relationship of the various parameters is such that core 71 is biased into saturation according to the invention as previously discussed.

Figure 8:
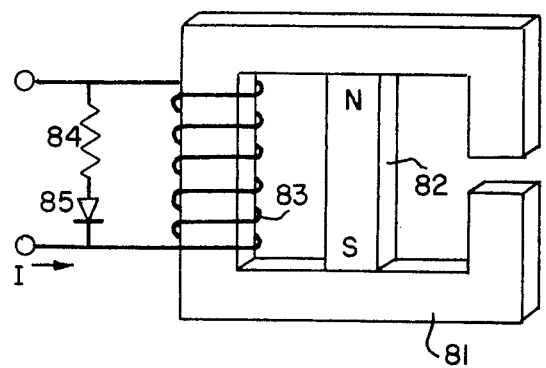
FIGS. 8 and 9 illustrate current limiters with power dissipation circuits for reactor stored energy.

FIG. 8 is an embodiment of the invention having a core 81, permanent magnet 82 and winding 83 similar to current limiter 10 of FIG. 1. Resistor 84 in series with diode 85 serves as a shunt circuit across winding 83 to dissipate potentially harmful stored energy in the reactor after a current surge. For example where a momentary load short causes a current surge, the peak current reached when the short is removed continues to flow in winding 83. Rather than allow the full current to flow through the load, it is partially shunted, thus dissipating energy in resistor 84 and diode 85. Since the voltage polarity across the winding reverses when the short is removed, diode 85 blocks current flow before but not after removal of the short.

Figure 9:
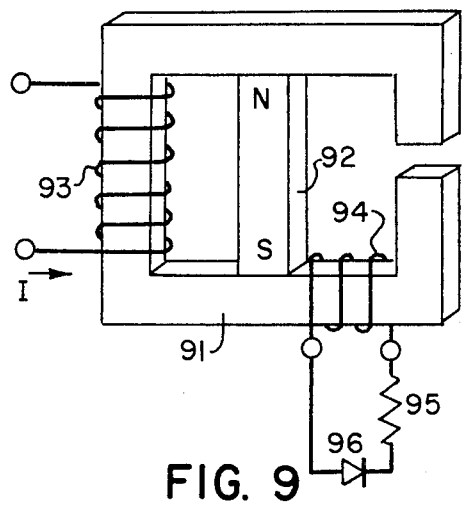

The embodiment of FIG. 9 shows an alternate arrangement for dissipating stored energy in the reactor. Core 91, winding 93 and permanent magnet 92 are configured and disposed in similar fashion to current limiter 10 of FIG. 1. A transformer winding 94 is disposed on the unsaturated section of core 91, shunted by resistor 95 and diode 96 in series. Upon removal of a load short circuit, the rate of change of flux in the core reverses from a positive to a negative rate, thus reversing the voltage polarity across winding 94. The polarities of winding 94 and diode 96 are determined to allow current flow and power dissipation in resistor 95 after removal of the load short but not before.

Figure 10:
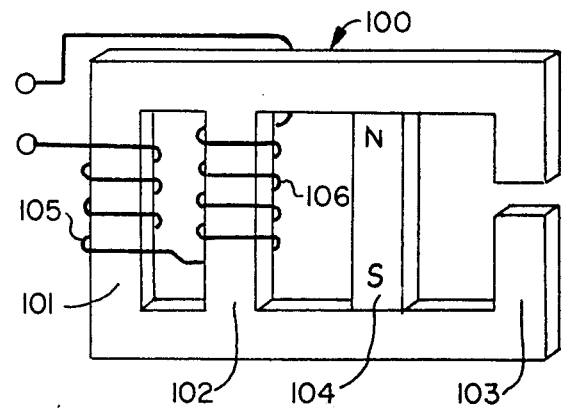
FIG. 10 depicts a current limiter for alternating surge currents.

The embodiment shown in FIG. 10 provides for limiting surges of alternating current. A high permeability core 100 includes legs 101, 102 and air gapped leg 103. Windings 105 and 106, disposed on legs 101 and 102 respectively, are connected in a series opposed relationship. Permanent magnet 1014 biases legs 101 and 102 into saturation under normal alternating current inputs to the windings, while the interleg connective material in core 100 is dimensionally proportioned to operate at unsaturated levels for both normal and surge conditions. At any instant of time, one winding is driving its leg deeper into saturation while the other winding is opposing the MMF of the permanent magnet and tending to drive its leg out of saturation. The situation is reversed with a change in current direction. Legs 101 and 102 are alternately driven out of saturation by an alternating current surge, leg 103 serving as a flux shunt. In turn, windings 105 and 106 offer high impedance to surging current flow according to the invention.

Figure 11:
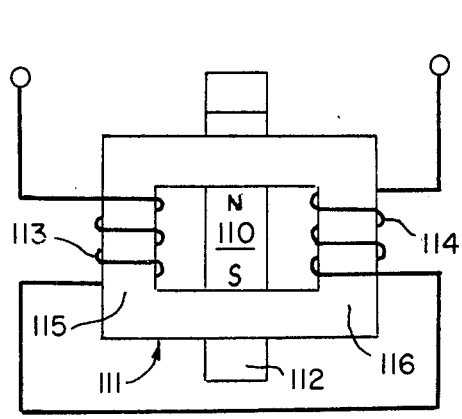
FIGS. 11-13 show additional embodiments of alternating current limiters.
Figure 12:
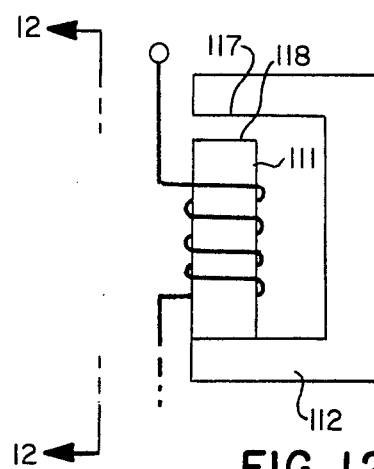

FIGS. 11 and 12 show another embodiment for limiting alternating current. Windings 113 and 114 are connected in series aiding relationship on opposing legs 115 and 116 respectively of closed core 111. Permanent magnet 110 is centered inside of the core 111 to bias legs 115 and 116 into saturation under normal currents conditions, while their interconnective legs are proportioned to operate in an unsaturated condition for normal and surge currents. A C-shaped core 112 centrally bridges core 111 in perpendicular alignment. An air gap is provided between face 117 of core 112 and face 118 of core 111. Core 112 is biased by permanent magnet 110 at a low unsaturated level of flux and provides a flux shunting path when legs 115 and 116 are alternately driven out of saturation by an alternating current surge.

As with the aforementioned embodiments, the permanent magnet (magnet 110) may be replaced by a bias coil and associated means for providing a bias current through the coil.

Figure 13:
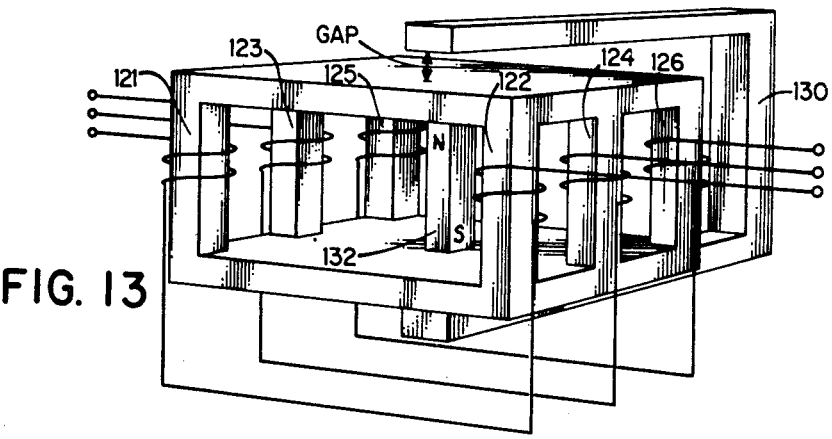

An alternative embodiment is shown in FIG. 13 for a three phase current limiting device having three pairs of wound legs 121 and 122, 123 and 124, 125 and 126, respectively, common shunting leg 130 and a bias leg 132, all extending between two nodes. Each of the three pairs have an associated input coil wound in a similar manner to the pair of legs described above in conjunction with FIGS. 11 and 12. The bias leg 132 may comprise a permanent magnet or a bias coil and associated current source. The shunt leg 130 in the present embodiment is a C-shaped core similar to core 112 in FIGS. 11 and 12, establishing an air gap between the upper portion of shunt leg 130 and the upper junction of the pairs of wound legs 121-126 and bias leg 132. In operation, with relatively low currents in the windings, bias leg 132 saturates legs 121-126 while maintaining shunt leg 130 in its non-saturated state. Alternating current surges in the windings alternately drive the associated legs out of saturation in a similar manner to the previously described embodiments. In n-phase systems, n pairs of legs and associated input coils may be similarly arranged. In the multiple phase embodiments, the input coils are connected to the external circuit as in a three phase motor. Circuitry for dissipation of stored energy, such as varistor, may be connected across each leg winding.

Figure 14:
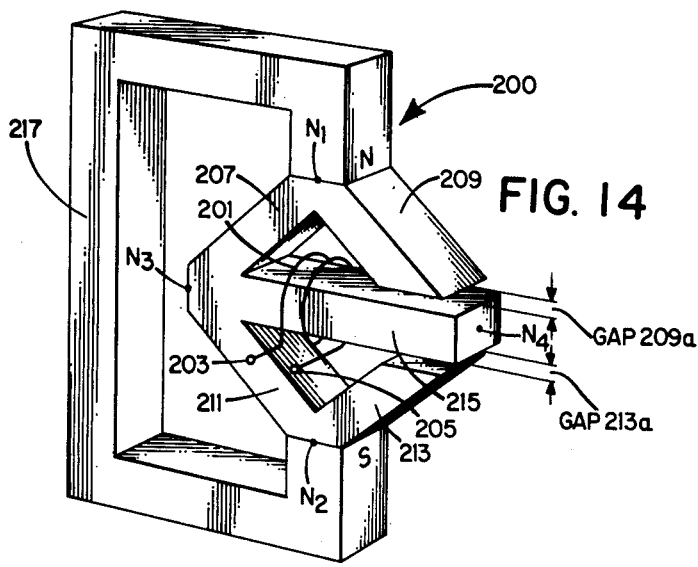
FIG. 14 illustrates a current limiter in accordance with the present invention.
Figure 15:
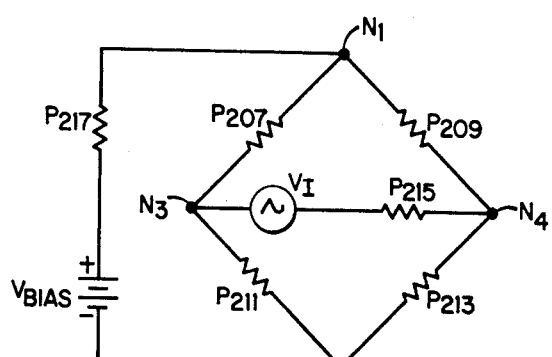
FIG. 15 is an electric circuit analog of the current limiter shown in FIG. 14.

A single winding current limiting device 200 for a.c. or d.c. lines is shown in FIG. 14. An electrical circuit analog configuration for this device is shown in FIG. 15. The device 200 includes an input coil 201 having terminals 203 and 205 for electrically coupling the device 200 to an external electric circuit. The magnetic circuit includes a bridge network having a pair of upper leg elements 207 and 209 joined at a first node, N1, a pair of lower leg elements 211 and 213 joined at one end at a second node, N2, and a cross element 215 having a first end connected to legs 207 and 211 at a third node, N3, and its other end connected to legs 209 and 213 at a fourth node, N4. The cross element 215 passes through coil 201 so that magnetic flux is induced in the cross element in response to current in the input coil 201.

In the illustrated embodiment, each of legs 209 and 213 include a high permeability, solid portion and a respective one of air gaps 209a and 213a, with the gaps between the respective solid portions and the cross element 215. In this embodiment, the gap portions of legs 209 and 213 and the end of leg 215 are defined as "joined" at N4. In other configurations, for example, the legs 209 and 213 may include solid portions physically joined to the cross element 215 at N4 with the gaps 209a and 213a located at intermediate points along legs 209 and 213, i.e. between nodes N1 and N4, and N2 and N4, respectively. Alternatively, the relative permeances associated with legs 209, 213 and 215 may be controlled by the geometry and material composition so that gaps may not be necessary.

The device 200 further includes a magnetic bias element 217 (characterized by permeance $P_E$) connected between nodes N1 and N2. In the illustrated embodiment, the bias element 217 is a permanent magnet having a north pole near node N1 and a south pole near node N2. In alternative embodiments, a suitably arranged coil and associated current bias source may establish equivalent fields at the nodes N1 and N2, and may be used in lieu of permanent magnet 217.

In the present embodiment, legs 207 and 211 are each composed of a saturable magnetic material and thus, these legs provide flux paths between N1 and N3 and between N3 and N2 which are characterized by permeances ($P_A$ and $P_B$) which are relatively high when the respective leg elements are in their non-saturated states, and relatively low otherwise.

The upper leg element 209 and the associated air gap 209a together with the cross element 215 provide a shunt path between nodes N1 and N3 characterized by a relatively high permeance ($P_C$) throughout the range of operation of the device. Similarly, leg element 213 at its associated gap 213a together with cross element 215 provide a flux path between the nodes N2 and N3 which is characterized by a relatively high permeance ($P_D$) throughout the range of operation of the device.

The electrical circuit analog shown in FIG. 15 corresponds to the configuration of FIG. 14, wherein each element is characterized by a conductance (analogous to the permeance) denoted by the reference designation P and an identifying numerical subscript. The voltage source $V_I$ is representative of the flux induced in element 215 as a result of current through coil 201, and the voltage source $V_{BIAS}$ is representative of the mmf bias associated with bias element 217.

The relative permeances of the bridge elements establish a net magnetic flux density in both legs 207 and 211 equal to the saturation flux density for those elements when the current in the external circuit (i.e. in coil 201) is between lower and upper threshold values of that current. When the current in coil 201 is in a predetermined range above and extending from the upper threshold value, the flux produced by element 217 passes from node N1 by way of leg 209, cross element 215, leg 211 to node N2. In this case, leg 211 remains saturated while leg 207 is in its non-saturated high permeance state. Similarly, when current in coil 201 passes in the other direction and is in a predetermined range below and extending from the lower threshold value, the flux from bias element 217 passes from node N1 by way of leg 207, cross element 215 and leg 213 to node N2. In this case, the leg 207 remains saturated while the leg 211 is in its non-saturated, high permeance state.

Accordingly, excursions of current in coil 201 extending beyond the upper or lower threshold values require the external circuit to drive the flux in device 200 by way of one of the air gaps 209a or 213a, depending on the polarity of the current surge in the coil 201. As a result, at the point where the current in coil 201 exceeds the threshold, one of the legs 207 and 211 switches from its saturated to its non-saturated state and the impedance presented by device 200 at the terminals 203-205 switches from a relatively low value to a high value, thereby providing a current limiting action in the external line.

Figure 16:
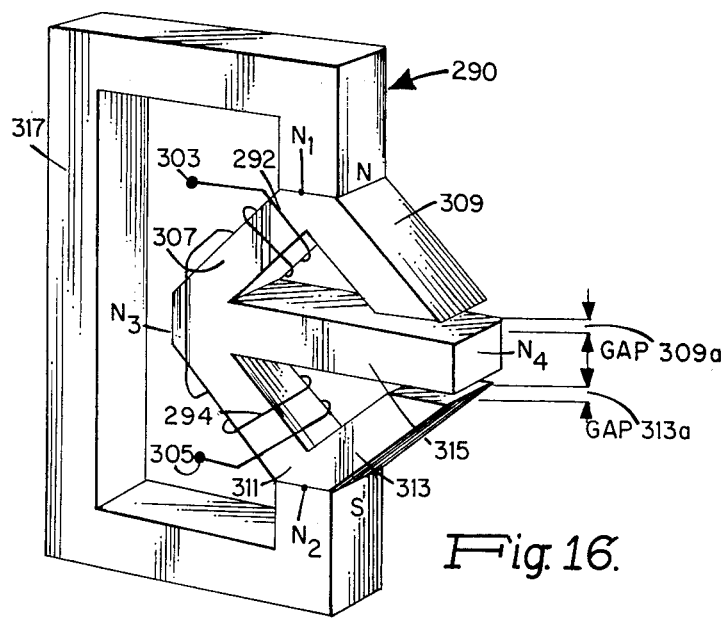
FIG. 16 illustrates an alternative embodiment of the present invention.

A two winding current limiting device 290 for a.c. or d.c. lines is shown in FIG. 16. The device 290 includes input coils 292 and 294 coupled in series between terminals 303 and 305 for electrically coupling the device 290 to an external electric circuit. The magnetic circuit includes a bridge network similar to that shown in FIG. 14 and having a pair of upper leg elements 307 and 309 joined at a first node, N1, a pair of lower leg elements 311 and 313 joined at one end at a second node, N2, and a cross element 315 having a first end connected to legs 307 and 311 at a third node, N3, and its other end connected to legs 309 and 313 at a fourth node, N4. The elements 307 and 311 pass through input coils 292 and 294 so that mmf is induced across those elements in response to current in the respective coils.

In the illustrated embodiment, each of legs 309 and 313 include a high permeability, solid portion and a respective one of air gaps 309a and 313a, with the gaps between the respective solid portions and the cross element 315. In this embodiment, the gap portions of legs 309 and 313 and the end of leg 315 are defined as "joined" at N4. In other configurations, for example, the legs 309 and 313 may include solid portions physically joined to the cross element 315 at N4 with the gaps 309a and 313a located at intermediate points along legs 309 and 313, i.e. between nodes N1 and N4, and N2 and N4, respectively. Alternatively, the relative permeances associated with legs 309, 313 and 315 may be controlled by the geometry and material composition so that gaps may not be necessary.

The device 290 further includes a magnetic bias element 317 (characterized by permeance $P_E$) connected between nodes N1 and N2. In the illustrated embodiment, the bias element 317 is a permanent magnet having a north pole near node N1 and a south pole near node N2. In alternative embodiments, a suitably arranged coil and associated current bias source may establish equivalent fields at the nodes N1 and N2, and may be used in lieu of permanent magnet 317.

In the present embodiment, legs 307 and 311 are each composed of a saturable magnetic material and thus, these legs provide flux paths between N1 and N3 and between N3 and N2 which are characterized by permeances ($P_A$ and $P_B$) which are relatively high when the respective leg elements are in their non-saturated states, and relatively low otherwise.

The upper leg element 309 and the associated air gap 309a together with the cross element 315 provide a shunt path between nodes N1 and N3 characterized by a relatively high permeance ($P_C$) throughout the range of operation of the device. Similarly, leg element 313 at its associated gap 313a together with cross element 315 provide a flux path between the nodes N2 and N3 which is characterized by a relatively high permeance ($P_D$) throughout the range of operation of the device.

The relative permeances of the bridge elements establish a net magnetic flux density in both legs 307 and 311 equal to the saturation flux density for those elements when the current in the external circuit (i.e. in coils 292 and 294) is less than a first threshold value in a first polarity and less than a second threshold value in the other polarity. When a current of the first polarity in coils 292 and 294 has a magnitude in a predetermined range greater than and extending from the first threshold value, the flux produced by element 317 passes from node N1 by way of leg 309, cross element 315, leg 311 to node N2. In this case, leg 311 remains saturated while leg 307 is in its non-saturated high permeance state. Similarly, when a current of the other polarity in coils 292 and 294 has a magnitude in a predetermined range greater than and extending from the second threshold value, the flux from bias element 317 passes from node N1 by way of leg 307, cross element 315, and leg 313 to node N2. In this case, the leg 307 remains saturated while the leg 311 is its non-saturated, high permeance state.

Accordingly, excursions in magnitude of the current in coils 292 and 294 extending beyond the threshold values require the external circuit to drive the flux in device 290 by way of one of the air gaps 309a or 313a, depending on the polarity of the current surge in the coils 292 and 294. As a result, at the point where the current in coils 292 and 294 exceeds the threshold, one of the legs 307 and 311 switches from its saturated to its non-saturated state and the impedance presented by device 290 across the terminals 303 and 305 switches from a relatively low value to a high value, thereby providing a current limiting action in the external line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device for limiting current in an electrical circuit comprising:
   A. a multiple branch element magnetic circuit including:
      i. a bridge network having at least four nodes and a pair of upper leg elements joined at one end at a first of said nodes, a pair of lower leg elements joined at one end at a second of said nodes, and a cross element having one of its ends joined to one of said lower and upper leg elements at a third node, said cross element having the other of its ends joined to the other lower and upper leg elements at a fourth node,
      wherein said upper and lower leg elements joining said third node are characterized by non-linear permeances $P_A$ and $P_B$, respectively, and have saturated and non-saturated states, $P_A$ and $P_B$ being greater when the corresponding one of said third node leg elements is in its non-saturated state than when in its saturated state, and the magnetic flux density in one of said third node leg elements being equal to a saturation flux density which is relatively invarient with respect to magneto-motive force applied across that element when in said saturated state and said magnetic flux density being less than said saturated flux density otherwise, and
      wherein the flux path between said first and third nodes along said cross-element and said upper leg element joining said fourth nodes is characterized by a permeance $P_C$, and the flux path between said second and third nodes along said cross element and said lower leg element joining said fourth node is characterized by a permeance $P_D$,
      ii. a magnetic bias element connected between said first and second nodes, said bias element being characterized by a permeance $P_E$ and including a magneto-motive force (mmf) bias means for establishing a substantially constant magnetic flux density in said bias element, and
   B. an input coil including means for electrically coupling said device to said electrical circuit so that said current passes therethrough, said coil having a plurality of windings extending about said upper and lower leg elements joining said third node so that mmf is induced across those elements in response to said current, said windings being adapted so that said mmf is directed away from said third node when said current is one polarity and is directed toward said third node when said current is the other polarity,
   wherein said elements are magnetically coupled at said nodes, and
   wherein $P_C$ and $P_D$ are relatively high with respect to the medium external to said device, $P_A$ and $P_B$ are greater than $P_C$ and $P_D$ and are relatively high with respect to the medium external to said device when the respective third node leg elements are non-saturated, and $P_E$ is relatively low with respect to $P_C$ and $P_D$ and with respect to $P_A$ and $P_B$ when the respective third node leg elements are non-saturated,
   wherein further the net magnetic flux density in one of said third node leg elements is equal to the saturation flux density for that element when said current is of a first polarity and has a magnitude less than a first threshold value or when said current is of the other polarity, and said net flux density is below said saturation flux density when said current is of said first polarity and has a magnitude in a predetermined range greater than and extending from said first threshold value, and
   wherein further the net magnetic flux density in the other of said third node leg elements is equal to the saturation flux density for that element when said current is of said first polarity, or when said current is of said other polarity and has a magnitude less than a second threshold value, and said net flux density is below said saturation flux density when said current is of said second polarity and has a magnitude in a predetermined range greater than and extending from said second threshold value.

* * * * *